United States Patent Office 2,844,514
Patented July 22, 1958

2,844,514
PROCESS FOR THE PRODUCTION OF NUCLEOTIDES

Samuel A. Morell, Whitefish Bay, Samuel H. Lipton, Milwaukee, and Alexander Frieden, Whitefish Bay, Wis., assignors to Pabst Brewing Company, Milwaukee, Wis., a corporation of Delaware No Drawing. Application November 4, 1953
Serial No. 390,242

4 Claims. (Cl. 195—30)

This invention relates to nucleotides and their production. The invention is concerned particularly with a new process for preparing nucleotides and with new nucleotides produced thereby, including certain new highly electrically charged nucleotides.

Nucleotides are organic compounds which are composed of essentially three molecular fragments: (1) an organic base such as adenine, uracil, cytosine, guanine, etc.; (2) a sugar such as ribose, desoxyribose, galactose, glucose, etc.; and (3) an inorganic phosphate or pyrophosphate. In nature, the most frequent form in which these components are found to be linked together is: base-sugar-phosphate. The base-sugar linkage is invariably between one of the nitrogen atoms of the organic base and the reducing group of the sugar, a so-called N-glycosidic bond, as for example, in the nucleosides adenosine, or adenine-9-riboside, and uridine, or uracil-3-riboside. The inorganic phosphate and/or pyrophosphate components may be linked to the sugar at any of the remaining free hydroxyl positions of the sugar, thus giving rise to isomeric nucleotides, as for example "muscle" adenylic acid, or adenosine-5'-phosphate (AMP), "yeast" adenylic acid-"a", or adenosine-2'-phosphate, and "yeast" adenylic-"b", or adenosine-3'-phosphate. Other known 5'-substituted adenosine nucleotides are adenosine-5'-diphosphate (ADP) and adenosine-5'-triphosphate (ATP), which may be isolated from yeast.

It is known that the addition of adenosine and phosphate to a yeast fermentation system results in the enzymatic synthesis of AMP, ADP and ATP. The adenosine which is added to the yeast mixture may be either in the purified form, or as one of the nucleoside components of a mixture arising from the hydrolysis of ribonucleic acid, i. e., a concentrate containing the mixed nucleosides adenosine, guanosine, cytidine and uridine. The hydrolysis of the ribonucleic acid to the nucleoside-containing mixture may be conducted by any of the known methods (Levene and Bass, "Nucleic Acids," 1931 edition, pp. 162–167; Smythe, U. S. Pat. No. 2,606,899; Phelps, U. S. Pat. No. 2,152,662).

It has now been discovered that hydrolysis of ribonucleic acid to the nucleoside stage, and subsequent phosphorylation by means of yeast enzymes, can be so conducted that nucleotides are formed which show higher electrical charges than that of ATP, the most highly electrically charged nucleotide heretofore known. Examples of such nucleotides which have now been discovered are uridine-5'-triphosphate ("UTP"), cytidine-5'-triphosphate ("CTP"), and guanosine-5'-triphosphate ("GTP").

The known triphosphate of adenosine, ATP, is represented by the following structural formula:

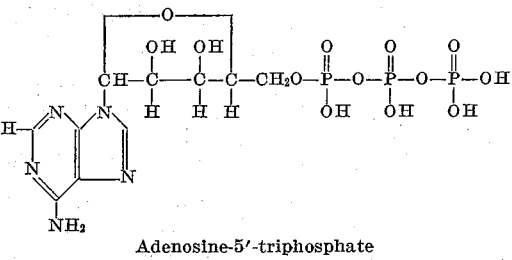

Adenosine-5'-triphosphate

The new nucleotides, UTP, CTP and GTP, are represented by the following formulae:

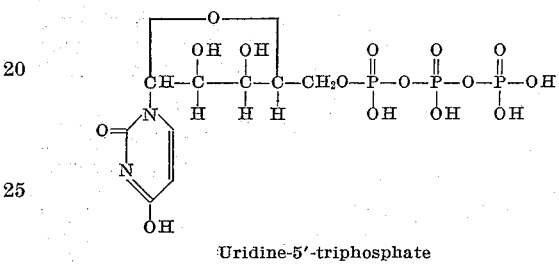

Uridine-5'-triphosphate

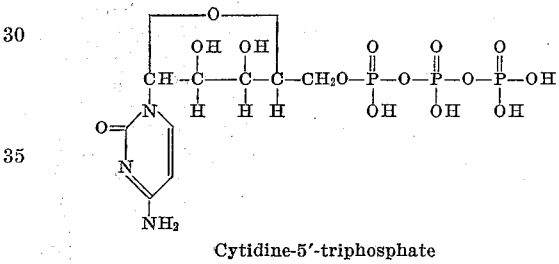

Cytidine-5'-triphosphate

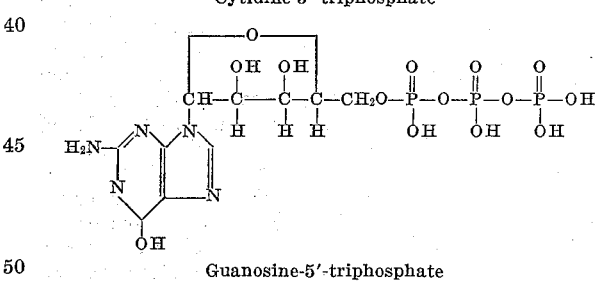

Guanosine-5'-triphosphate

The new nucleotides were shown to possess higher electrical charges, compared with ATP, as follows:

(1) When subjected to an electrical potential in a buffer solution at pH 3.7 ("Electrophoresis," Bock and Alberty, J. Biol. Chem. 193, 435 (1951)), they migrated faster than ATP.

(2) On paper-chromatographic exposure to a 5% sodium diphosphate-isoamyl alcohol system (Cohn and Carter, J. Am. Chem. Soc. 72, 4273 (1950)), they migrated faster than ATP.

The new process in accordance with the invention involves hydrolyzing ribonucleic acid to produce a mixture of ribonucleosides, and treating the ribonucleoside mixture with a compound having a phosphate group and yeast enzymes under conditions favoring production of uridine-5'-triphosphate.

In the new process, it has been found that mixtures of mono- and polyphosphates of the nucleosides are formed and that the following conditions produce the new, more highly charged nucleotides, UTP, CTP and GTP.

The preparation of an advantageous mixture of ribonucleosides results from:

(1) Hydrolyzing yeast ribonucleic acid with an alkaline earth metal base such as magnesium oxide at a temperature of about 120–155° C., preferably 140–150° C.

(2) Employing such an amount of base that the pH at the end of the hydrolysis is about 7.5–8.5, preferably 8–8.5.

(3) Precipitating polynucleotides and nucleotides from the hydrolysate by treatment with a soluble salt of a heavy metal, such as lead.

The preferred treatment of the mixture of ribonucleosides involves:

(1) Conducting the "yeast phosphorylation" in the presence of a sugar and initiating the phophorylation at a molar ratio sugar:orthophosphate:nucleoside of about 1:6–12:0.01–0.03.

(2) Conducting the yeast phosphorylation only until phosphate consumption substantially reaches a maximum, when there occurs a marked decrease in the rate of consumption of phosphate, which takes place within a relatively short period of time, ordinarily not exceeding 3–5 hours.

(3) Conducting the yeast phosphorylation at a relatively low temperature, i. e., not exceeding about 28° C.

(4) Maintaining a pH of about 6–7 during the course of the phosphorylation.

UTP, particularly, and CTP and GTP are produced in appreciable amounts, so that they are readily separated from other nucleotides.

In an especially preferred embodiment of the invention, the mixture of ribonucleosides obtained by hydrolysis of ribonucleic acid is crystallized, and the crystal fraction and mother liquor fraction obtained are separately subjected to the yeast phosphorylation. From the crystals, UTP is produced in a mixture which is much easier to purify, and it is obtained in much higher yield. From the mother liquor, CTP and GTP are produced in a mixture from which these nucleotides are more easily separable, in relatively high yields.

In the preparation of ribonucleosides from ribonucleic acid, sufficient magnesium oxide, for example, is added to produce a pH of about 7.5–8.5, preferably 8–8.5, at the end of the hydrolysis. The amount required may vary with the ribonucleic acid source. Ordinarily, about 15 to 20% by weight, preferably about 17–18%, based on ribonucleic acid, of magnesium oxide will provide the desired pH. The ribonucleic acid and the magnesium oxide are agitated and heated in water under pressure until hydrolysis to nucleosides has reached a maximum. The reaction ordinarily requires about 3–5 hours at about 140–150° C. The temperature may be about 120–150° C., the reaction time decreasing with increasing temperature.

The suspension is cooled, and most of the guanosine precipitates and is removed by filtration. To the filtrate is added a soluble lead salt such as lead acetate in aqueous solution until no more precipitation occurs at pH 6.5–7.5, preferably 7–7.4. Excess lead is removed, and the solution is adjusted to a pH preferably of about 7.3–7.7 and concentrated to a syrup containing the nucleosides adenosine, cytidine, uridine, and guanosine, and some nucleotides that were not precipitated.

In the yeast phosphorylation or fermentation, the yeast enzymes are preferably supplied in the form of an active yeast, such as fresh or frozen brewer's yeast. Other known sources of the enzymes are suitable, such as those described in U. S. Patent No. 2,174,475. The yeast enzymes, phosphate, sugar, and the nucleoside mixture, such as the syrup described above, which it is desired to react are mixed in water, and the mixture is maintained at a temperature of about 22–28° C. until the maximum uptake of phosphate has occurred. The pH is maintained at about 6–7 during the reaction. The phosphate consumption is measured periodically in order to determine when the maximum has occurred, which is generally within a period of from about 2–5 hours, depending upon the activity of the yeast.

Various sources of phosphate can be supplied, such as water-soluble inorganic phosphates, particularly alkali metal or ammonium phosphates providing a buffer solution, sugar phosphoric acid esters or glycerophosphates. The sugar is preferably a yeast-fermentable sugar such as an aldo- or ketohexose, for example, glucose (dextrose), fructose, mannose or galactose, or a disaccharide such as sucrose.

The reaction is then stopped by heating or reducing the pH of the mixture to about 3, insoluble material is removed, and the nucleotides are separated from the mixture. One method of separating them is by precipitation in the form of their barium salts. The salts are converted to their free acids by metathesis with sulfuric acid, the precipitated barium sulfate is removed, and the nucleotides are precipitated from the solution. There is obtained a mixture of higher and lower charged nucleotides of the nucleosides produced by hydrolysis of ribonucleic acid.

Individual nucleotides are preferably separated from their mixture by chromatography over an anion exchange resin, for example, as described by Cohn et al., J. Am. Chem. Soc. 72, 4273 (1950); Oak Ridge National Laboratory, Bull. AECU–430, Aug. 29, 1949, Oak Ridge, Tenn. Thus, an aqueous neutral solution of the nucleotides is adsorbed on an anion exchange resin, preferably in the chloride, sulfate, formate or acetate form, and the components of the solution are selectively eluted with an aqueous solution of a salt, such as alkali metal or ammonium chloride, sulfate or acetate, increasing the salt concentration and, where advantageous, decreasing the pH as elution progresses. Due to the differences in the electrical charges of the various components, this method is especially suitable for resolving them and particularly for separating the new nucleotides of high charge, UTP, CTP and GTP. The nucleotides may be removed from the eluate fractions obtained by precipitation and metathesis to the acid forms as described above. The acid forms may be precipitated from solution by addition of a water-miscible organic solvent, such as an alcohol or acetone. Likewise, various salts may be precipitated by partial or complete neutralization followed by addition or organic liquid. The desirable alkali metal salts are produced in this way, an especially advantageous product being monosodium uridine-5'-triphosphate, a granular, stable, water soluble salt.

A very effective resolution or purification technique has been discovered, which involves adsorbing and selectively eluting, or chromatographing, a nucleotide mixture successively on anion exchange resin in the form of resin salt of a weak acid, elution being with a solution containing the anion of a weak acid, and on anion exchange resin in the form of resin salt of a strong acid, elution being with a solution containing the anion of a strong acid. For example, a nucleotide mixture is adsorbed on resin in the acetate form and eluted with a solution containing acetate ions. One or more of the eluate fractions containing UTP, CTP or GTP is then adsorbed on resin in the chloride form and eluted with a solution containing chloride ions. UTP, CTP or GTP is recovered from the fraction in which it is concentrated, or adsorption-elution may be repeated. Rapid, excellent purification and very good recoveries of pure products are achieved.

The following examples are furnished to assist in providing a complete understanding of the invention, but it is to be understood that the invention is not limited thereto nor to the specific compositions, proportions and procedures set forth therein, which are given only for purposes of illustration.

Example 1

To 8 gallons of hot water were added 5 kilograms of ribonucleic acid and 850 grams of magnesium oxide. The mixture was heated in an autoclave with continuous agitation for 4 hours at 40–45 p. s. i. g. steam pressure (about 140–145° C.). The resulting suspension, which had a pH of 8.0–8.5, was filtered and then cooled for 18 hours at 4° C. Guanosine precipitated and was removed by filtration.

To the filtered solution was added 850 grams of neutral lead acetate in the form of a 10% aqueous solution, and the pH was adjusted to 7.2±0.2 with caustic soda. The resulting precipitate of nucleotides and polynucleotides that had not been completely hydrolyzed to the nucleoside stage was filtered and the excess lead removed with hydrogen sulphide. The solution was next adjusted to pH 7.5±0.2 with sodium hydroxide and concentrated to a thin syrup constituting the mixed nucleoside fraction containing adenosine, guanosine, cytidine and uridine.

To 20 gallons of fresh brewer's yeast (10% solids) contained in a vessel equipped for agitation and temperature control were added, in order, 5 gallons of an aqueous solution containing 1700 grams $Na_2HPO_4$, 11,100 grams $NaH_2PO_4 \cdot H_2O$, and 2000 grams of anhydrous dextrose, the nucleoside syrup described above, and finally 1300 ml. of toluene. The mixture was agitated continuously at 25±3° C. and small samples were removed every 15 minutes for inorganic phosphate analysis. The buffer salts maintained a pH of 6.5±0.5 during the course of reaction.

As soon as maximum uptake of inorganic phosphate occurred, which usually requires 2 to 5 hours and depends upon the specific gravity of the yeast, the reaction was stopped by adjustment to pH 3.0 with HCl, and the mixture was filtered. The nucleotides formed were precipitated as their barium salts by adding an excess of barium acetate and maintaining a pH of 8.5 (alkaline to phenolphthalein). The barium nucleotides were then converted to the free acids by metathesis with $H_2SO_4$ at pH 1.5±0.5. After removing the barium sulfate, the free nucleotides were precipitated by mixing the filtrate with 6 volumes of ethanol. The product was collected by filtering, washing, and drying in vacuo. The yield was 1200 grams of mixed nucleotides which exhibited the following electrophoretic analysis, listed in order of decreasing mobilities:

| | Percent |
|---|---|
| UTP | 13 |
| Unidentified nucleotide triphosphates | 4 |
| ATP and UDP | 69 |
| ADP | 12 |
| AMP | 2 |

A filtered solution of 500 grams of this product dissolved in 10 liters of water was passed through a bed of strongly basic quaternary anion exchange resin in the chloride form, which adsorbed over 90% of the nucleotides. Selective elution with sodium chloride-hydrochloric acid solutions of increasing salt concentration and decreasing pH removed 98% of the nucleotides from the column; elution progressed in the order of increasing mobility of the nucleotides.

The last 10% from the column was precipitated as barium salt at pH 8.5. The barium salt was converted to sodium salt by metathesis with sulfuric acid adjustment to pH 4.5 with sodium hydroxide, and precipitation with 6 volumes of cold ethanol. 17.5 grams of sodium salt were obtained, having the following analysis:

| | Percent |
|---|---|
| UTP | 52 |
| Unidentified nucleotide triphosphates | 10 |
| ATP and UDP | 31 |
| ADP | 7 |

The product thus obtained was adsorbed, eluted, and further processed as described above to produce 4 grams of purified sodium UTP having the following analysis:

| | Percent |
|---|---|
| UTP | 94 |
| Other nucleotides | 6 |

By repeating the adsorption-elution procedure, UTP of 95–100% purity can be obtained.

Uridine-5'-triphosphate is thus obtained in substantially pure form, by which is meant greater than about 90% pure, in acid or salt form. The substantially pure mono-alkali metal, preferably sodium, salt in solid form is particularly useful in various applications and is highly stable. Therapeutically pure solutions, particularly aqueous solutions, are readily prepared by dissolution of the high purity UTP produced. Where such purity is not required, compositions containing substantial amounts of UTP are available, and compositions consisting predominantly of UTP are also available.

Example 2

The nucleoside syrup described in Example 1 was seeded with crystals of adenosine, and crystallization was allowed to proceed at 4° C. until substantially no more crystal formation occurred. The crystal fraction was collected by filtration and washed with a small amount of cold water. This fraction was yeast-phosphorylated as described in Example 1, yielding 925 grams of mixed sodium nucleotides which exhibited the following analysis:

| | Percent |
|---|---|
| UTP | 8 |
| Unidentified nucleotide triphosphates | 5 |
| ATP | 73 |
| UDP | 5 |
| ADP | 9 |

500 grams of this product was dissolved in 10 liters of water, neutralized to pH 7.0 with alkali, filtered and passed through a bed of strongly basic quaternary anion exchange resin in the acetate form, which removed 96.8% of the nucleotides. Elution of the column with 1.0 N ammonium acetate gave the following fractions, the spectral ratios at 275/260 millimicrons being used as a guide to the composition of the various fractions (0.62 and 0.40 are obtained at $E_{275/260}$ for pure uridine-5'-triphosphate and adenosine-5'-triphosphate, respectively):

| Fraction | Percent of original total nucleotides to column | $E_{275/260}$ |
|---|---|---|
| 1 | 0.3 | 0.75–0.68 |
| 2 | 9.6 | 0.64–0.50 |
| 3 | 13.3 | 0.47–0.41 |

The eluate fraction No. 2 was precipitated first as barium salt and finally collected in the form of sodium salt as described in Example 1, yielding 37.0 grams of product (spectral ratio $E_{275/260}=0.54$, approximately 75% UTP). This fraction was then adsorbed on and eluted from strongly basic anion exchange resin in the chloride form as described in Example 1, UTP being concentrated in the later eluate fractions instead of in the early fractions as when the acetate ion processing was employed. 8.5 grams of 95% pure monosodium UTP were obtained from the eluate.

Example 3

The mother liquor from crystallization of the nucleoside syrup as described in Example 2 was yeast-phosphorylated as described in Example 1, to produce 537 grams of mixed sodium nucleotides which exhibited the following electrophoretic analysis:

|   | Percent |
|---|---|
| UTP | 6 |
| CTP and GTP | 12 |
| ATP | 49 |
| ADP and UDP | 27 |
| AMP | 6 |

100 grams of this product was adsorbed on strongly basic quaternary anion exchange resin in the acetate form, 64% of the nucleotides being adsorbed. The resin was eluated with ammonium acetate of increasing concentration, and the following fractions were obtained:

| Fraction | Percent of original total nucleotides to column | $E_{275/260}$ |
|---|---|---|
| 1 | 6.0 | 0.49–0.66 |
| 2 | 26.8 | 0.90–0.95 |
| 3 | 19.8 | 0.79–0.65 |
| 4 | 8.4 | 0.64–0.63 |

Fraction No. 2 was converted to the sodium salt and was then adsorbed and eluted from strongly basic anion exchange resin in the chloride form as described in Example 1. 0.42 gram of a sodium nucleotide which exhibited a spectral ratio $E_{275/260}$ of 0.94 was obtained. Paper chromatography showed the absence of adenine nucleotides. Based on a spectral ratio of 1.2 for cytidine nucleotides, the product was CTP of approximately 75% purity.

The eluate fraction No. 4 was refractionated on strongly basic resin in the chloride form, and an eluate fraction was obtained from which GTP of approximately 50% purity was obtained. The product also contained ATP.

Substantially pure CTP and GTP are obtained by further fractionation according to the above-described procedures.

There is thus provided by the invention an improved process for producing highly charged nucleotides and new nucleotides having higher phosphate contents, valuable in chemical, enzymatic and biological applications. High recoveries of pure products in a simple and reliable process are achieved in practicing the invention.

The invention is hereby claimed as follows:

1. The process which comprises hydrolyzing ribonucleic acid with magnesium oxide at a temperature of about 140–150° C. so that the final pH is about 8–8.5 to produce a mixture of ribonucleosides, precipitating nucleotides present in said mixture with a soluble salt of lead, separating the precipitate, crystallizing the resulting ribonucleoside mixture to produce a crystal fraction and a mother liquor fraction, and treating at least one of said fractions separately with inorganic phosphate, yeast enzymes and a sugar at a temperature of about 22–28° C. and about until a maximum consumption of phosphate has taken place to produce a mixture of ribonucleotides.

2. In a process for producing ribonucleotides by enzymatic phosphorylation of a ribonucleoside mixture obtained by hydrolysis of ribonucleic acid with an alkaline earth metal base followed by precipitation of nucleotides present in the hydrolysis mixture with a soluble salt of a heavy metal and separation of the precipitate, the improvement which comprises separately phosphorylating at least one of the fractions obtained by crystallizing the ribonucleoside mixture to produce a crystal fraction and a mother liquor fraction.

3. The process which comprises hydrolyzing ribonucleic acid with an alkaline earth metal base at a temperature of about 120–155° C. so that the final pH is about 7.5–8.5 to produce a mixture of ribonucleosides; precipitating nucleotides present in said mixture with a soluble salt of a heavy metal and separating the precipitate; crystallizing the resulting ribonucleoside mixture to produce a crystal fraction and a mother liquor fraction; and treating at least one of said fractions separately with a compound having a phosphate group, yeast enzymes and a sugar at a temperature not exceeding about 28° C., at a pH of about 6–7, at a molar ratio sugar:orthophosphate:nucleoside at the start of the treatment of about 1:6–12:0.01–0.03, and about until a maximum consumption of phosphate has taken place.

4. The process which comprises hydrolyzing ribonucleic acid with an alkaline earth metal base at a temperature of about 120–155° C. so that the final pH is about 7.5–8.5 to produce a mixture of ribonucleosides; precipitating nucleotides present in said mixture with a soluble salt of a heavy metal and separating the precipitate; crystallizing the resulting ribonucleoside mixture to produce a crystal fraction and a mother liquor fraction; and treating at least one of said fractions separately with a compound having a phosphate group, yeast enzymes and a sugar at a temperature not exceeding about 28° C. and about until a maximum consumption of phosphate has taken place.

References Cited in the file of this patent

UNITED STATES PATENTS

| 2,101,099 | Ruskin | Dec. 7, 1937 |
| 2,152,662 | Phelps | Apr. 4, 1939 |
| 2,606,899 | Smythe et al. | Aug. 12, 1952 |

FOREIGN PATENTS

| 615,891 | Great Britain | Jan. 13, 1949 |

OTHER REFERENCES

Chem. Abst., vol. 29, page 174 (1935).
Chem. Abst., vol. 34, page 66403 (1940).
Chem. Abst., vol. 44, pages 3905, 6, 7 (1950).
Kunin et al.: "Ion Exchange Resins," pub. by Wiley & Sons (N. Y.) 1950, page 132 relied on.
Chem. Abst., vol 45, page 6209 C (1951).
Cohn et al.: Nature, vol. 167, pp. 483–4 (1951).
Leloir: "Advances in Enzymology," vol. 14, pub. by Interscience Publishers (1953), N. Y. (pages 203 and 216 relied on).